(12) United States Patent
Woods et al.

(10) Patent No.: US 7,722,098 B2
(45) Date of Patent: May 25, 2010

(54) STEP LOAD BRACKET

(75) Inventors: Scott L. Woods, Macomb, MI (US); Robert Avers, Bowling Green, OH (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/204,892

(22) Filed: Sep. 5, 2008

(65) Prior Publication Data
US 2009/0066119 A1 Mar. 12, 2009

Related U.S. Application Data

(60) Provisional application No. 60/967,893, filed on Sep. 7, 2007.

(51) Int. Cl.
*B60R 19/48* (2006.01)
(52) U.S. Cl. ...................... 293/117; 248/235
(58) Field of Classification Search .............. 293/117, 293/102; 108/108, 134; 248/200, 235, 247, 248/300, 205.1, 48.2, 48.1
See application file for complete search history.

(56) References Cited

U.S. PATENT DOCUMENTS

| | | | | |
|---|---|---|---|---|
| 2,429,586 A | * | 10/1947 | Rompre | 248/248 |
| 2,583,922 A | * | 1/1952 | Zummach | 248/235 |
| 2,855,654 A | * | 10/1958 | Stroben | 248/235 |
| 3,006,658 A | * | 10/1961 | Wenham et al. | 280/851 |
| 3,429,540 A | * | 2/1969 | Worrallo | 248/246 |
| 4,198,913 A | * | 4/1980 | Haworth et al. | 108/108 |
| 4,313,357 A | * | 2/1982 | Hawkins | 83/81 |
| 4,455,007 A | * | 6/1984 | Varon et al. | 248/300 |
| 5,257,766 A | * | 11/1993 | Riblet | 248/248 |
| 5,310,148 A | * | 5/1994 | Dorr | 248/247 |
| 6,009,675 A | * | 1/2000 | Waalkes et al. | 52/239 |
| 6,260,489 B1 | * | 7/2001 | Weaver et al. | 108/152 |
| 6,497,461 B1 | * | 12/2002 | Harlan | 312/114 |
| 2007/0294953 A1 | * | 12/2007 | Guillen | 52/36.1 |

* cited by examiner

*Primary Examiner*—Kiran Patel
(74) *Attorney, Agent, or Firm*—Warn Partners, PC

(57) ABSTRACT

The present invention is a step load bracket having a substantially horizontal portion and a substantially vertical portion connected to the substantially horizontal portion. The present invention also includes at least one support member connected to the substantially vertical portion and the substantially horizontal portion. The support member provides support for a body component of a vehicle having a step, such as a fascia, when a load is applied to the fascia in a vertical direction, but has pre-determined crush characteristics when the fascia suffers from an impact load in a horizontal direction, such as during a rear-end collision.

10 Claims, 4 Drawing Sheets

US 7,722,098 B2

STEP LOAD BRACKET

CROSS-REFERENCE TO RELATED APPLICATIONS

This application claims the benefit of U.S. Provisional Application No. 60/967,893, filed Sep. 7, 2007. The disclosure of the above application is incorporated herein by reference.

FIELD OF THE INVENTION

The present invention relates to bracket used for providing support for a fascia used in a vehicle.

BACKGROUND OF THE INVENTION

Fascias and other types of body panel components are commonly used to provide an aesthetically pleasing appearance for a vehicle. These components are typically injection molded parts, and are most commonly used on the front or rear of the vehicle, and will have the appearance of a bumper and body panel formed as one component. These types of fascias are commonly used with sport-utility vehicles (SUVs), which commonly include a hatch for accessing or entering the rear of the vehicle.

The fascia, having the appearance of a bumper, includes a step portion for aiding in accessing and entering the rear of the vehicle through the hatch. Because the fascia is made of a relatively thin plastic, the step portion is not strong enough to support the weight of a person when being stepped on. Prior solutions to this problem have included the fascia being supported by an Expanded Polypropylene Particle (EPP) foam insert. This provided support of the bumper fascia step and ease of repair in the event of a rear impact. The fascia is also attached to the frame of the vehicle using the common EPP foam insert and various fasteners, such as a push-pin.

However, it is typically considered aesthetically unappealing if the fasteners which are used to attach the fascia to the foam insert are in view. Attempts have been made to attach the fascia to the foam insert in such a manner that the fasteners are no longer visible. However, this has resulted in reduced structural integrity of the foam insert and the fascia.

Accordingly, there exists a need for a step, formed as a portion of a fascia, to have support when force is applied in a vertical direction, while having the aesthetically pleasing appearance such that the fasteners are removed from view.

SUMMARY OF THE INVENTION

The present invention is a step load bracket having a substantially horizontal portion and a substantially vertical portion connected to the substantially horizontal portion. The present invention also includes at least one support member connected to the substantially vertical portion and the substantially horizontal portion. The support member provides support for a body component of a vehicle having a step, such as a fascia, when a load is applied to the fascia in a vertical direction, but has pre-determined crush characteristics when the fascia suffers from an impact load in a horizontal direction, such as during a rear-end collision.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
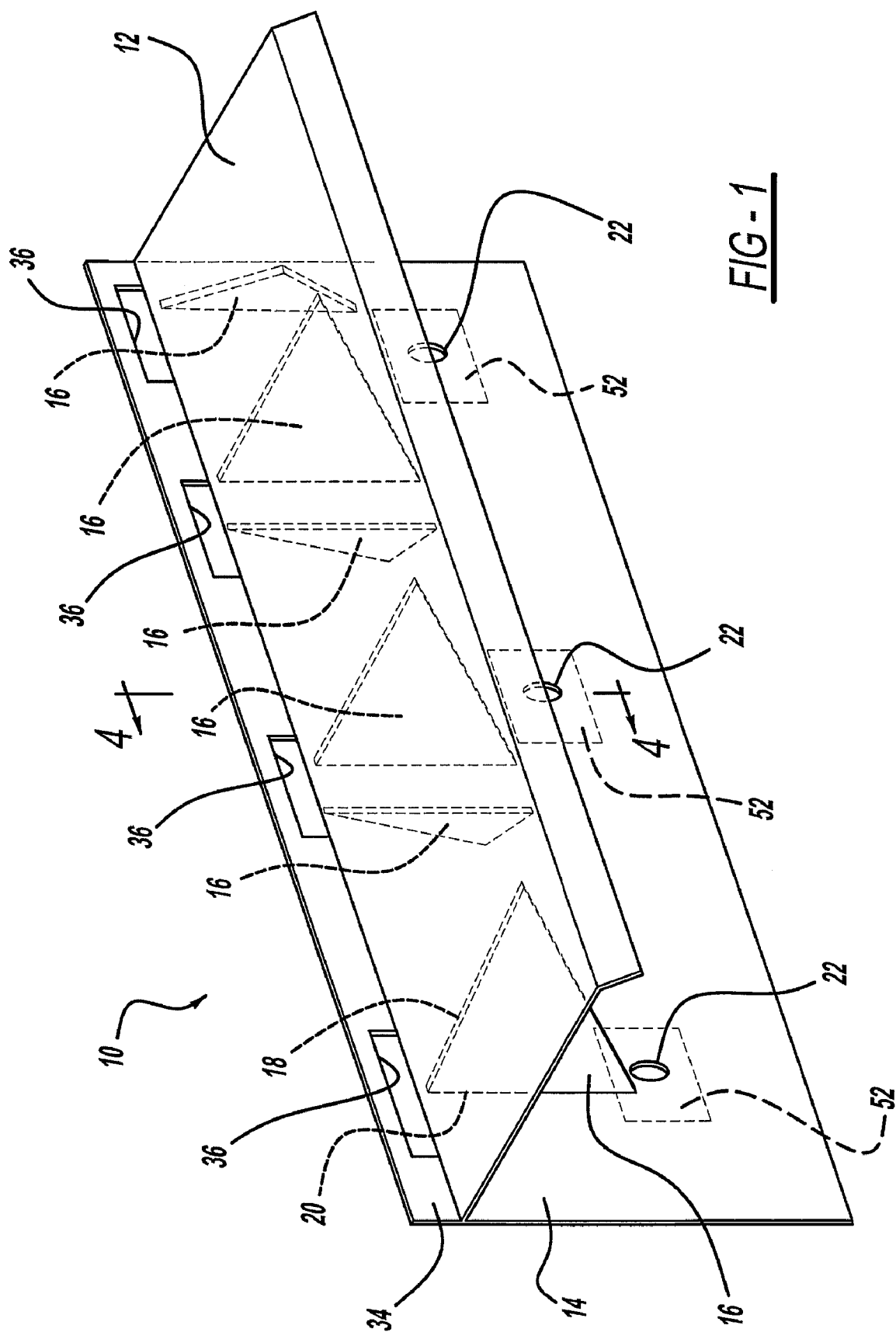
FIG. 1 is a perspective view of a step load bracket, according to the present invention.

The following description of the preferred embodiment(s) is merely exemplary in nature and is in no way intended to limit the invention, its application, or uses.

Referring to the Figures generally, a step load bracket according to the present invention is shown generally at 10. The bracket 10 includes a substantially horizontal portion 12 and a substantially vertical portion 14. Connected to both the horizontal portion 12 and vertical portion 14 are a series of support members 16. In this embodiment, each support member 16 is generally triangular in shape, and has a first side 18 connected to the horizontal portion 12, and a second side 20 connected to the vertical portion 14. As best seen when looking upwardly or downwardly at the horizontal portion 12 in FIG. 1, the support members 16 are arranged diagonally with respect to one another and are spaced apart so as to provide support for the horizontal support member 12.

The vertical portion 14 includes a series of apertures 22 which allow the vertical portion 14 to be attached to the vehicle by way of a fastener, such as a screw or push-pin (not shown). The bracket 10 is attached to a rear trough cross-member 24. The rear trough cross-member 24 is attached to the vehicle, and optionally forms part of the frame of the vehicle.

Once the bracket 10 is attached to the rear trough cross-member 24, a panel, which in this embodiment is a fascia 26, is attached to the bracket 10. The fascia 26 covers the bracket 10 and the rear trough cross-member 24. The bracket 10 provides an attachment surface which allows the fascia 26 to be attached to the vehicle without the use of visible fasteners, such as conventional push-pins or the like. The fascia 26 includes a step-portion 28 and a vertical portion 30, which has the general appearance of a bumper. The vertical portion 30 is adaptable such that the vehicle can include a trailer hitch, generally shown at 32.

Figure 2:
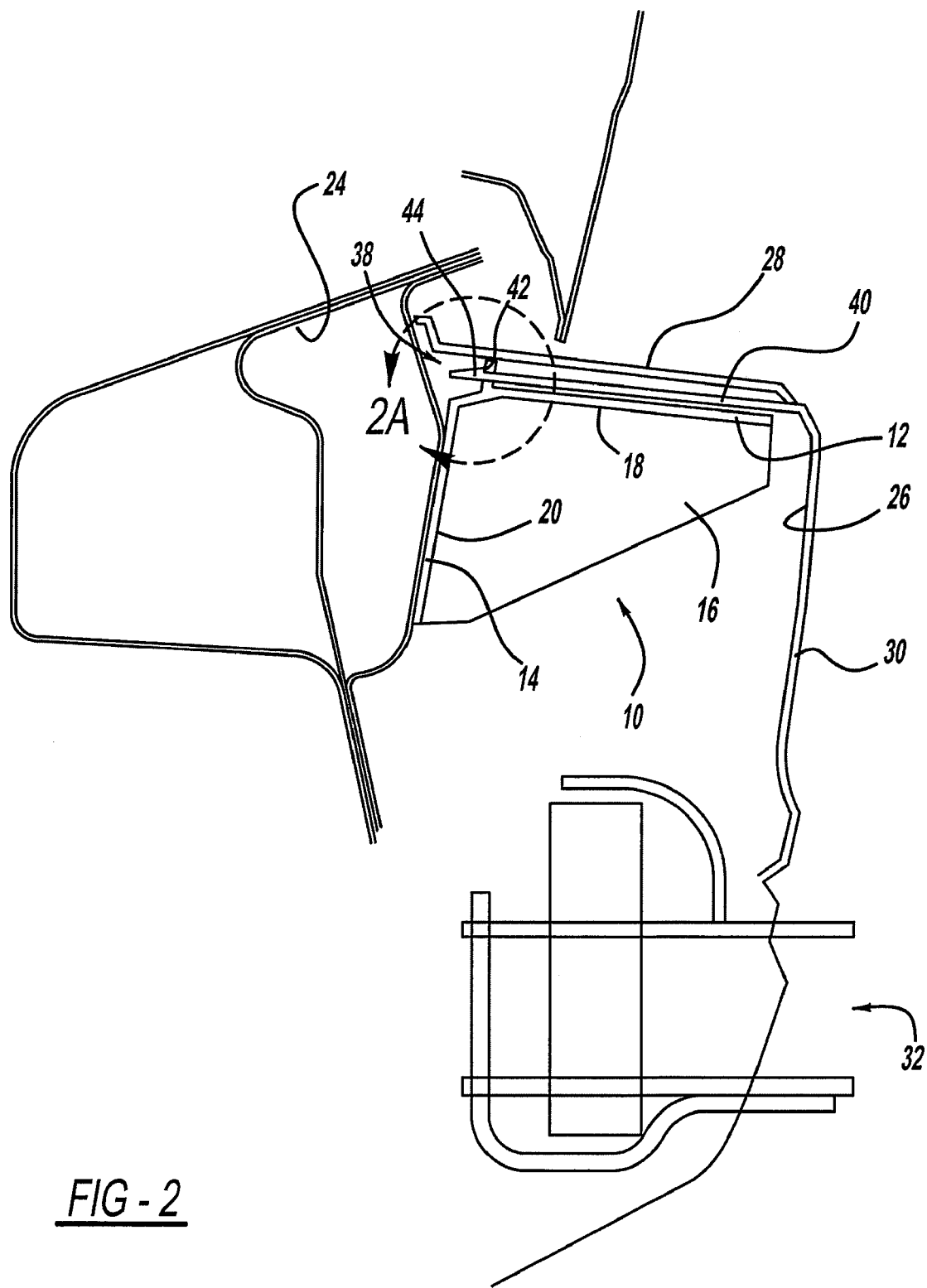
FIG. 2 is a sectional side view of a step load bracket connected to a cross-member, with the section of the step load bracket taken along lines 2-2 of FIG. 3, according to the present invention.
Figure 2A:
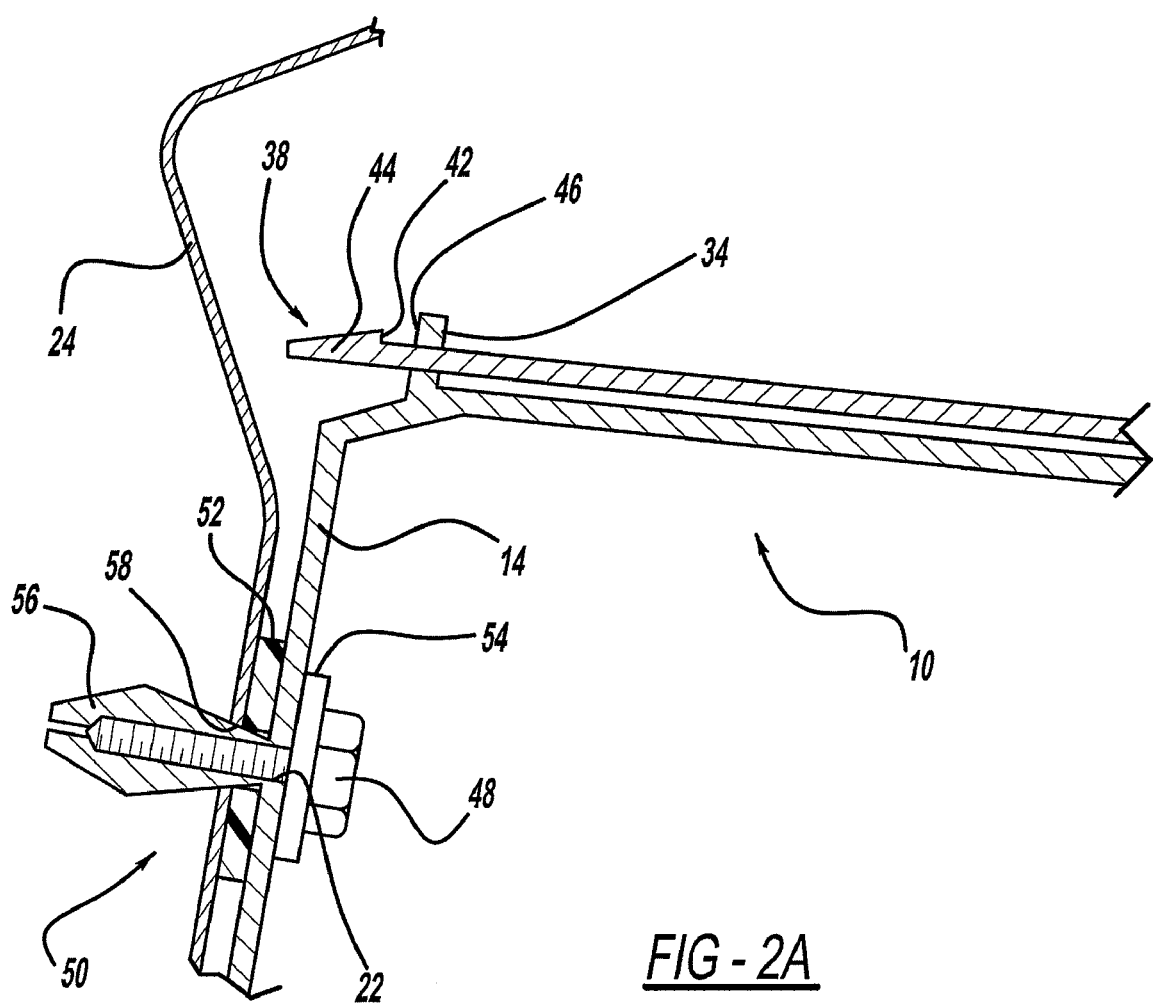
FIG. 2A is an enlarged portion of the circled area of FIG. 2, with a fastener used to attach a step load bracket to a vehicle, according to the present invention.
Figure 3:
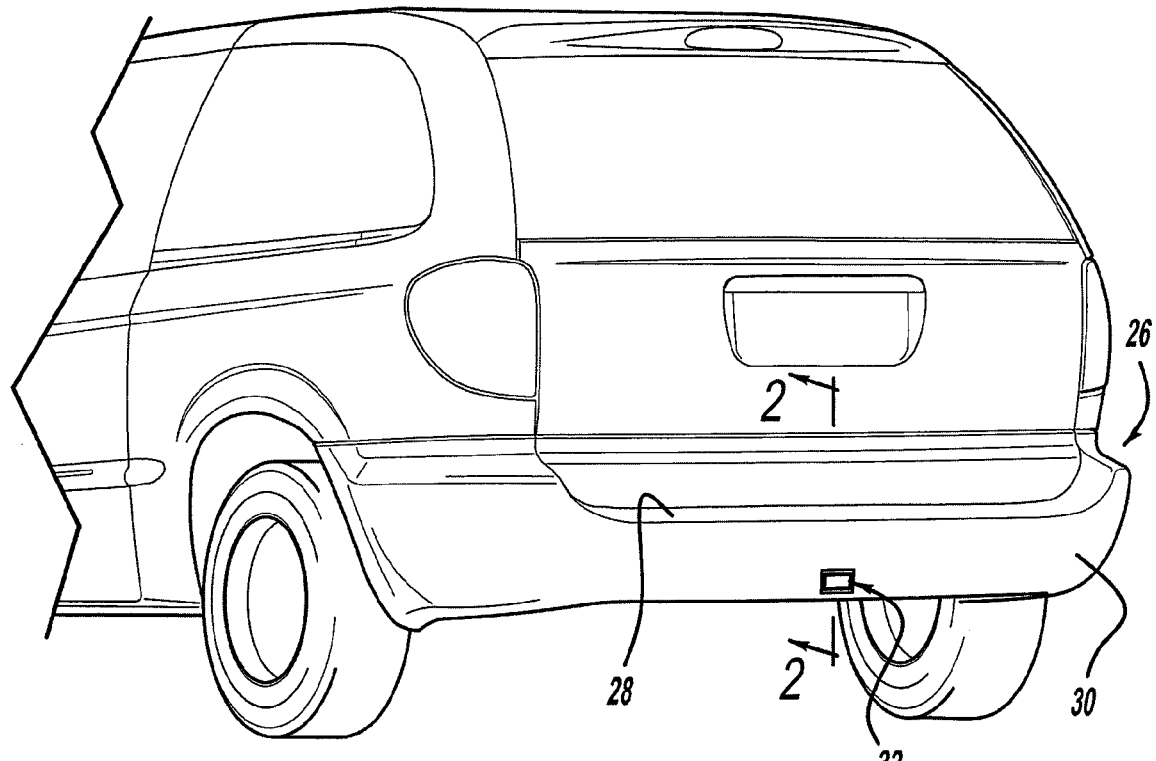
FIG. 3 is a rear perspective view of a vehicle having a step load bracket, according to the present invention.

The step load bracket 10 also includes an upper lip 34 having several slots 36. The each slot 36 receives an angled tab, generally shown at 38, which is connected to an extension 40. The extension 40 is part of the fascia 26. The angled tabs 38 include a flat surface 42 and an angled portion 44. As the angled tabs 38 are inserted through the respective slots 36, the angled tab 38 is slightly compressed until the tab 38 is completely through the slot 36; the tab 38 being extended through one of the slots is shown in FIG. 2A. Once the tab 38 is through the slot 36, the flat surface 42 will rest against a corresponding surface 46 which is part of the lip 34, preventing the fascia 26 from becoming detached from the bracket 10, shown in FIG. 2.

Figure 4:
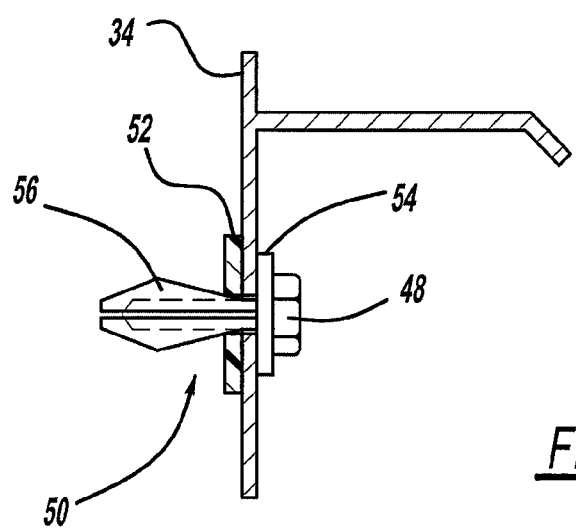
FIG. 4 is a sectional side view of a portion of a step load bracket, taken along lines 4-4 of FIG. 1, with a fastener inserted, according to the present invention.

Another embodiment showing how the bracket 10 of the present invention is attached to a vehicle using another type of fastener is shown in FIGS. 2A and 4. In this embodiment, a bolt 48 along with a washer 54 and clip, which in this embodiment is a molded in clip, generally shown at 50, are used to attach the vertical portion 14 of the bracket 10 to the vehicle. Also included is a foam seal 52 which surrounds the clip 50. The foam seal 52 is optional, and may be incorporated if it is necessary that moisture be prevented from entering the area behind the rear trough cross-member 24.

The molded in clip 50 includes a plurality of leg portions 56, and is molded as part of the vertical portion 14 of the bracket 10. The aperture 22 extends through the clip 50, and there is a corresponding aperture 58 formed in the rear trough cross-member 24. The foam seal 52 (if used) is slipped onto the clip 50 such that the plurality of leg portions 56 of each of the clips 50 extend through an aperture of a respective foam seal 52. The rear trough cross-member 24 is then positioned so that the plurality of leg portions 56 of each of the clips 50 also extend through the apertures 58 in the rear trough cross-member 24 as shown in FIG. 2A. The bolt 48 is screwed into the clip 50. As the bolt 48 is screwed into the clip 50, the leg portions 56 will spread apart, forcing the rear trough cross-member 24 and vertical portion 14 closer together, compressing the foam seal 52, and preventing the bolt 48 from being pulled through the apertures 22,58, securing the bracket 10 to the rear trough cross-member 24. The compression of the seal 52 will prevent moisture from getting into the area behind the rear trough cross-member 24.

Another feature of the invention includes the ability for the bracket 10 to collapse if the rear of the vehicle is impacted, such as during an accident. This preserves the structural integrity of the rear trough cross-member 24, which is costly to replace. During a collision, the support members 16 will collapse and fold, allowing the horizontal member 12 to collapse and fold as well. The support members 16 collapse prior to the other components because of their diagonal configuration relative to one another, best seen in FIG. 1. Having the support members 16 configured diagonally with respect to one another as shown in FIG. 1 facilitates the support members 16 having the ability to collapse during a rear-impact collision of the vehicle, but still allows the support members 16 to support the horizontal portion 12, allowing the step-portion 28 to be stepped on during ingress and egress of the rear of the vehicle. If the bracket 10 collapses during a collision, the structural integrity of the rear trough cross-member 24 is preserved, only necessitating the replacement of the bracket 10, which is less costly compared to the rear trough cross-member 24.

Preferably, the bracket 10 is an injection molded structure with the support members 16 angled in alternating fashion at approximately forty-five degrees as shown in FIG. 1 to provide the proper crush structure. Other crush structures can also be utilized, as long as the crush structure provides the proper step support while allowing rear impact crush characteristics. For instance, vertical support columns of honeycomb structures, egg crate-shaped structures, or accordion-shaped vertical column structures could be used along with other shapes with predetermined crush characteristics.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A step load bracket, comprising:
    a substantially horizontal portion;
    a substantially vertical portion connected to said substantially horizontal portion; and
    at least one support connected to said substantially vertical portion and said substantially horizontal portion, said support for maintaining vertical support of a step while allowing predetermined crush failure characteristics upon horizontal impact;
    a rear trough cross-member, wherein said substantially vertical portion is connected to said rear trough cross-member, and said support prevents damage to said rear trough cross-member upon horizontal impact;
    one or more apertures formed as part of said substantially vertical portion;
    one or more apertures formed as part of said rear trough cross-member; and
    one or more corresponding fasteners extending through said one or more apertures of said substantially vertical portion and said one or more apertures of said rear trough cross-member, attaching said substantially vertical portion to said rear trough cross-member.

2. The step load bracket of claim 1, said at least one support member further comprising a plurality of support members arranged diagonally relative to one another.

3. The step load bracket of claim 1, said at least one support member further comprising:
    a first side connected to said substantially horizontal portion; and
    a second side connected to said substantially vertical portion.

4. The step load bracket of claim 1, said one or more corresponding fasteners further comprising:
    one or more clips formed as part of said substantially vertical portion, said one or more apertures formed as part of said substantially vertical portion extending through said one or more clips, each of said one or more clips having a plurality of leg portions; and
    one or more bolts extending through each of said one or more apertures formed as part of said one or more clips such that when said one or more bolts are inserted through said one or more clips, said plurality of leg portions are spread apart, thereby retaining said vertical portion to said rear trough cross-member.

5. The step load bracket of claim 4, further comprising a foam seal disposed between said vertical portion and said rear trough cross-member for preventing moisture from entering the area behind said rear trough cross-member.

6. The step load bracket of claim 1, further comprising said step to be operably associated with said substantially vertical portion such that when a force is applied to said step, said at least one support member will support said substantially horizontal member and said step.

7. The step load bracket of claim 6, wherein said step is formed as a portion of a fascia.

8. The step load bracket of claim 7, wherein said fascia is connected to said step load bracket.

9. The step load bracket of claim 8, further comprising:
    a lip formed as a portion of said substantially vertical portion;
    one or more slots formed as part of said lip; and
    one or more tabs formed as part of said fascia such that said one or more tabs are inserted through said one or more slots, thereby securing said fascia to said step load bracket.

10. The step load bracket of claim 1, wherein said support member is collapsible with respect to said substantially horizontal portion, and said substantially vertical portion.

* * * * *